Figure 1:
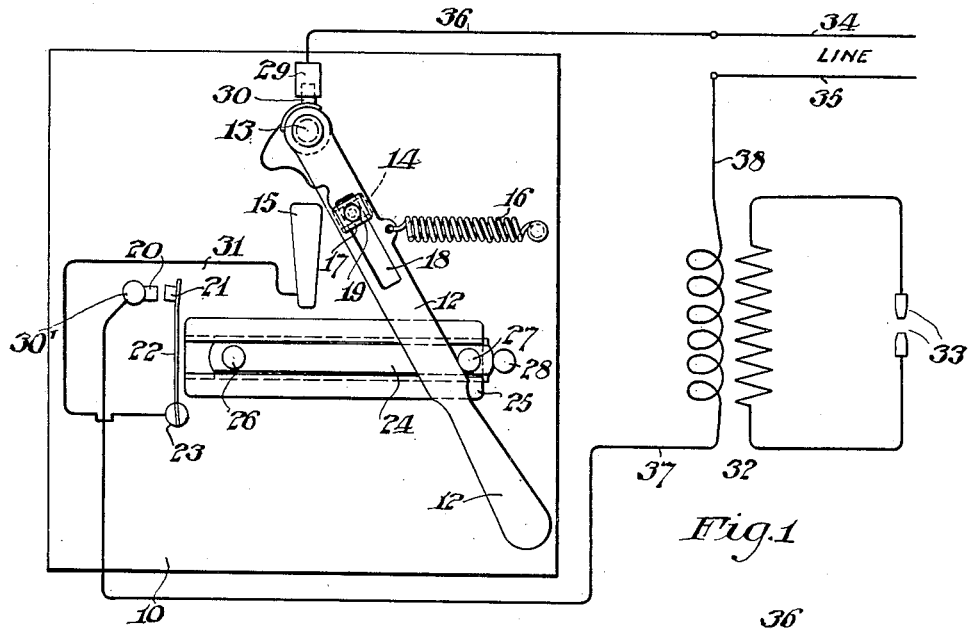

March 16, 1937.　　J. C. WHITESELL, JR　　2,074,138
TIMING SWITCH FOR WELDING
Original Filed April 29, 1932

INVENTOR:
John C. Whitesell Jr.
BY
John P. Tarbox
ATTORNEY.

Patented Mar. 16, 1937

2,074,138

UNITED STATES PATENT OFFICE 2,074,138

TIMING SWITCH FOR WELDING

John C. Whitesell, Jr., Norristown, Pa., assignor to Edward G. Budd Manufacturing Company, Philadelphia, Pa., a corporation of Pennsylvania Application April 29, 1932, Serial No. 608,193
Renewed April 30, 1934

7 Claims. (Cl. 200—33)

The present invention relates to electric welding and more particularly to timing switches for timing the flow of welding current in short time welding, such as spot welding.

In such welding, particularly the spot welding of thin gauge metals and more particularly in the spot welding of alloys such as stainless steel where relatively high current densities and extremely brief time intervals are used, the high density currents and the consequent likelihood of burning or the production of other detrimental effects due to too long an application of current, render it highly essential that the timing be regulated with meticulous exactitude and capable of a high degree of standardization for repeated welding operations. Also because of the heavy currents used in such apparatus and the heavy duty imposed on the apparatus, such apparatus must be of simple, sturdy and strong embodiment.

The chief object of the present invention is therefore to provide a simple, but accurate and reliable timing switch capable of fine adjustment of the time interval and the handling of extremely heavy currents, and which when carefully adjusted by a skilled workman may be entrusted to the unskilled with assurance of reliability of operation and the standardized results desired.

I attain the objects of my invention by the provision of a sturdy swinging member in the form of a pivoted lever strongly biased in normal position and carrying a movable contact arranged to sweep over a stationary contact as the lever is moved about its pivot, the timing being affected by the quick movement of the lever under tension of the biasing means back to the normal position. Adjustment of the timing is effected by arranging the movable contact so that it may be adjusted along the lever radially to and from the pivotal point of the lever, thereby varying the radius of its arc of travel with consequent variation in its speed of travel over the stationary contact.

To render the contact effective only in the high speed movement of the lever under tension of the biasing means, and ineffective during the tensioning movement of the lever, an auxiliary contact is arranged in series with the main timing contact and operated by suitable lost motion connection with the operating lever, so that the auxiliary contact is closed only during the rapid timing movement of the lever under tension of the biasing means.

Further objects and advantages of the invention will be apparent from a perusal of the following specification and the drawing accompanying the same.

Figures 2, 3:
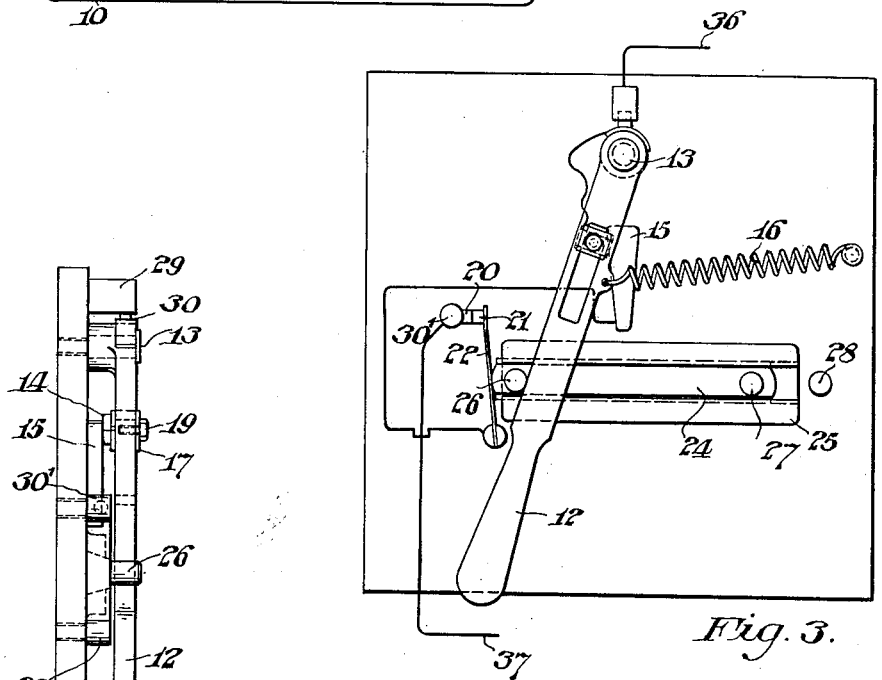

In the drawing:

Fig. 1 is a front view of an apparatus constructed according to the invention, together with a diagram of the circuit connections to a welding transformer, Fig. 2 is a side elevation looking from the left of Fig. 1, Fig. 3 is a front view similar to that of Fig. 1 but showing the apparatus in the extreme off-normal position.

Referring to the drawing in detail, the base 10 carries an operating lever 12 pivoted thereto at 13 and carrying a movable timing contact 14 arranged to sweep over a stationary timing contact 15 as the lever is moved from the normal position shown in Fig. 1 over to the extreme off-normal position shown in Fig. 2, the lever 12 being held in normal position by suitable tensioning means such as the retractile spring 16. The stationary contact 15 is of such width in relation to the arc of travel of the contact 14 that the movable contact 14 will be wholly disengaged therefrom in either of the extreme positions of the operating lever 12. The retractile spring 16, of course, will operate to pull the lever from the extreme off-normal position back to the normal position in the same given time each time the lever is released from the off-normal position. To provide for a variation of the time required for the contact 14 to sweep over the contact 15 on return movement of the lever, the contact 14 is arranged to be adjusted radially of the lever by means of its being mounted in the carrier 17 which is slidably mounted in the slot 18 and arranged to be locked in adjusted position by suitable clamping means, such as the clamping bolt 19. It will be clear that as the contact carrier is adjusted to increasing distances from the pivot, the radius of its arc of travel will be increased with consequent increase of lineal velocity for a given angular velocity of the lever. To accentuate the variation in timing responsive to radial adjustment of the movable contact, especially for the briefer time intervals, the stationary contact 15 is tapered as it extends radially from the pivot so as to present a shorter path of contact travel for the movable contact in the higher speed adjustments of the latter.

As the variation in width of the contact 15 is gradual and not in steps, and the contact 14 adjustable to the slightest degree desirable, the timing may be adjusted with extreme exactitude.

To prevent closure of the circuit during the setting movement of the operating lever from the normal position to the extreme off-normal position, I provide an auxiliary pair of normally open contacts included in series with the main timing contacts 14—15, arranged to maintain the circuit open during the setting movement of the operating lever. The auxiliary contacts consist of a stationary contact 20 and a movable contact 21 carried by a spring support 22 mounted on the post 23, the spring support 22 being biased to normally hold the contact 21 away from the stationary contact 20 as indicated in Fig. 1. For actuating the auxiliary contacts 20—21, I provide an auxiliary actuating member 24 in the form of a bar slidably mounted in the guideway 25 in a manner to enable its left-hand end to move into and out of engagement with the spring mounting 22 of the contact 21 to close and open the auxiliary contacts 20—21, the member 24 being mounted in the guideway 25 with sufficient friction to maintain it in either of its extreme positions unless forcibly moved therefrom. Movement of the member 24 is effected by lost-motion transmitting means between it and the operating lever 12 comprising a pair of studs 26 and 27 mounted at opposite ends of the member 24, projecting into the path of the operating lever 12 and so spaced as to be engaged by the lever 12 only near each of its extreme positions and after the movable contact 14 has disengaged the stationary contact 15, as indicated by the two different positions shown in Figs. 1 and 3. To limit the extreme right-hand movement of the auxiliary actuating element 24, I provide a stop member 28. This limitation of the extreme right-hand movement of the member 24 also determines the extreme off-normal position of the operating member 12 due to engagement of the lever with the stud 27.

Circuit connection is made with the movable contact 14 by way of a suitable connecting post 29 which carries a brush element 30 bearing against the pivoted end of the lever 12, the circuit being continued to the contact 17 through the metallic bodies of the lever 12 and carrier 17. The post 29 thus constitutes one of the main terminals of the switching device. The other main terminal of the switching device is the post 30' carrying the stationary contact 20. The circuit between these two main terminals is completed through the main and auxiliary contacts and the connection of the post 23 with the stationary contacts 15 over a connecting conductor 31. In the application of the device to the control of a welding system such as indicated by the transformer 32 and electrodes 33, the posts 29 and 30' are connected in series with the primary winding of the transformer 32 and a suitable source of current, such as the line 34—35, by way of conductors 36, 37 and 38.

In operation, assuming the parts to be in the position indicated in Fig. 1, and the time accurately adjusted to the interval desired, the operator places the electrodes 33 in engagement with the work and thereupon pulls the lever 12 to the extreme off-normal position indicated in Fig. 3. In this movement of the lever, the movable contact 14 sweeps over the stationary contact 15 and disengages the same just before the lever reaches the extreme off-normal position shown in Fig. 3. Just after the contact 14 disengages the left-hand edge of the stationary contact 15 the lower portion of the lever 12 engages stud 26 moving the auxiliary actuating element 24 into engagement with the spring 22 to close auxiliary contacts 20—21, thus partially closing the circuit of the transformer primary, which partially closed circuit may be traced from line wire 34, conductor 36, post 29, lever 12, contact 14, 15, 31, 23, auxiliary contacts 20—21, conductor 37, primary of transformer 32, and back over conductor 38 to line wire 35. The operator now releases the lever 12 which flies back to normal position under tension of the retractile spring 16, causing the movable contact 14 to sweep across the contact 15 and out of engagement therewith before the lever strikes the stud 27. When during this rapid return of the lever to normal position the contact 14 engages the left-hand edge of the contact 15, the energizing circuit of the transformer 32 is closed over the path as previously traced, and remains closed until the contact 14 leaves the right-hand edge of the stationary contact 15, after which the lever 12 strikes the stud 27, moving the auxiliary actuating member 24 to the right out of engagement with the contact 21 and against the stop 28, the lever 12 and other parts now assuming the normal position indicated in Fig. 1, which leaves the apparatus in condition for a repeated operation.

While I have thus herein shown and described a particular embodiment of my invention, it is to be understood that the invention is not limited to such specific embodiment, but contemplates all such modifications and variants thereof as fall fairly within the scope of the appended claims.

I claim as my invention:

1. A timing switch for electric welding circuits comprising a conducting circuit, a movable contact and a complementary stationary contact included in series in said circuit, a pivot about which said movable contact is mounted to swing over and past its complementary stationary contact into and out of engagement therewith, means for moving said movable contact about the pivot a given angular extent in a given time, said stationary contact being extended radially from said pivot and progressively reduced in dimension in the direction of adjustable movement of the movable contact, as it extends radially from the pivot, and said movable contact being adjustable radially of the pivot to cause the movable contact to sweep over different portions of the stationary contact of different dimension in the direction of such sweeping movement and to simultaneously vary the radius of its arc of swing with consequent variation of velocity.

2. A timing switch for electric welding circuits comprising a pivoted actuating member, motor means for moving said actuating member through substantially a given angular movement in substantially a given time for each operation, a stationary contact decreasing in width as it extends away from the pivotal axis of the actuating member, a movable contact member mounted on the actuating member to sweep over the stationary contact in the direction of width of the latter, and means for adjusting the position of the movable contact on the actuating member radially of the pivotal axis of the actuating member.

3. A timing switch for electric welding comprising a conducting circuit, a pair of normally open timing contacts in series in the circuit, a pair of normally open auxiliary contacts in said circuit in series with said timing contacts, tension means normally holding said timing contacts open, tension means normally holding said auxiliary contacts open, means for moving the timing contact over and past its complementary stationary contact against the tension of its tension means, means operable in the continued movement of the timing contact in its tensioning movement to move the auxiliary movable contact into engagement with its complementary stationary contact only after the timing contact has moved on past its stationary contact in the tensioning movement, and means operable in the return movement of said timing contact under tension of its tensioning means to open said auxiliary contacts only after the timing contact has moved clear of its complementary stationary contact in its retractile movement.

4. A timing switch for electric welding, comprising a conducting circuit, a pivoted lever, biasing means tending to hold the lever in normal position, a stationary contact member, a movable timing contact carried by said lever and arranged to move across the stationary contact into and out of engagement therewith in a given angular movement against the biasing means from normal position to a given extreme off-normal position, a pair of normally open auxiliary contacts, biasing means tending to normally hold said auxiliary contacts open, an auxiliary actuating element arranged to close and open said auxiliary contacts and mounted to move with sufficient friction to hold the auxiliary contacts closed against the tension of their biasing means, and a lost-motion connection between said auxiliary actuating element and the lever arranged to move said actuating lever into contact closing position when the lever assumes the off-normal position and into contact opening position when the lever assumes the normal position.

5. A timing switch for electric circuits comprising a plurality of pairs of relatively movable contacts all normally open, connected in series and arranged to effect the closing and opening of a circuit, the circuit being normally open and the closing of the circuit being effected solely by the simultaneous engagement of all of said contacts, means for retaining said contacts normally apart, means for closing and opening one of said pairs of contacts independently of the other in setting the switch for a timing operation, means for closing the other of said pairs of contacts after the reopening of said first described pair of contacts, and means for retaining said last described pair of contacts closed during a timed subsequent closure of said first described pair of contacts, said switch being arranged to effect the disengagement of all of said pair of contacts at the termination of said timed circuit closure.

6. A timing switch for electric circuits comprising a pair of normally open circuit closing contacts and a pair of normally open, relatively slidable timing contacts connected in series, biasing means tending to hold said timing contacts in a given open position, means for relatively moving said timing contacts past each other against the tension of said biasing means into a second open position, and means operable to close said circuit closing switch upon relative movement of the timing contacts into said second open position and to open said circuit closing contacts upon relative movement of the timing contact into said given open position.

7. A timing switch for electrical circuits comprising a pair of normally open, circuit closing contacts and a pair of normally open timing contacts connected in series, one of said timing contacts being slidable past the other into and out of closed circuit position, biasing means for biasing said movable timing contact in normal open circuit position, manual means for moving said slidable timing contact past the other timing contact into a second open circuit position against the tension of said biasing means, and means operable to close said circuit closing contacts upon predetermined movement of said slidable contact in one direction and to open said circuit closing contacts upon predetermined movement of said slidable contact in the opposite direction.

JOHN C. WHITESELL, Jr.